(12) United States Patent
Cao et al.

(10) Patent No.: US 7,061,663 B2
(45) Date of Patent: Jun. 13, 2006

(54) CAPSULES, MATERIALS FOR USE THEREIN AND ELECTROPHORETIC MEDIA AND DISPLAYS CONTAINING SUCH CAPSULES

(75) Inventors: Lan Cao, Everett, MA (US); Libing Zhang, Sharon, MA (US); Charles H. Honeyman, Roslindale, MA (US); Kimberly L. Houde, Washington, DC (US); Andrew L. Loxley, Roslindale, MA (US); David D. Miller, Wakefield, MA (US); Richard J. Paolini, Jr., Framingham, MA (US); Tibyron Quinn, Medford, MA (US); Michael L. Steiner, New Richmond, WI (US); Thomas H. Whitesides, Somerville, MA (US)

(73) Assignee: E Ink Corporation, Cambridge, MA (US)

( * ) Notice: Subject to any disclaimer, the term of this patent is extended or adjusted under 35 U.S.C. 154(b) by 0 days.

(21) Appl. No.: 11/162,467

(22) Filed: Sep. 12, 2005

(65) Prior Publication Data
US 2006/0007528 A1    Jan. 12, 2006

Related U.S. Application Data

(62) Division of application No. 10/249,966, filed on May 22, 2003, now Pat. No. 6,958,848.

(60) Provisional application No. 60/319,342, filed on Jun. 24, 2002, provisional application No. 60/319,343, filed on Jun. 24, 2002, provisional application No. 60/319,265, filed on May 23, 2002.

(51) Int. Cl.
*G02B 26/00* (2006.01)
*B01J 13/18* (2006.01)
*G03G 17/04* (2006.01)

(52) U.S. Cl. ............... 359/296; 264/4.33; 264/4.7; 430/32

(58) Field of Classification Search ............ 264/4, 264/4.1, 4.3, 4.33, 4.7; 359/296; 430/32, 430/34, 38; 544/347; 546/257
See application file for complete search history.

(56) References Cited

U.S. PATENT DOCUMENTS

| 2,766,478 A | 10/1956 | Raley, Jr. et al. |
| 2,800,457 A | 7/1957 | Green et al. |

(Continued)

FOREIGN PATENT DOCUMENTS

EP    1 145 072 B1    5/2003

(Continued)

OTHER PUBLICATIONS

Amundson, K., et al., "Flexible, Active-Matrix Display Constructed Using a Microencapsulated Electrophoretic Material and an Organic-Semiconductor-Based Backplane", SID 01 Digest, 160 (Jun. 2001).

(Continued)

*Primary Examiner*—David N. Spector
(74) *Attorney, Agent, or Firm*—David J. Cole

(57) ABSTRACT

An encapsulation material, intended for use in encapsulated electrophoretic displays, comprises the coacervation product of a polyanionic polymer having a vinyl main chain and a plurality of anionic groups bonded to the main chain, with a cationic or zwitterionic water-soluble polymer capable of forming an immiscible second phase on contact with the polyanionic polymer.

12 Claims, 4 Drawing Sheets

U.S. PATENT DOCUMENTS

| | | |
|---|---|---|
| 3,389,194 A | 6/1968 | Somerville |
| 3,423,489 A | 1/1969 | Arens et al. |
| 3,668,106 A | 6/1972 | Ota |
| 3,756,693 A | 9/1973 | Ota |
| 3,767,392 A | 10/1973 | Ota |
| 3,792,308 A | 2/1974 | Ota |
| 3,870,517 A | 3/1975 | Ota et al. |
| 3,892,568 A | 7/1975 | Ota |
| 4,001,140 A | 1/1977 | Foris et al. |
| 4,087,376 A | 5/1978 | Foris et al. |
| 4,123,206 A | 10/1978 | Dannelly |
| 4,196,437 A | 4/1980 | Hertz |
| 4,211,668 A | 7/1980 | Tate |
| 4,273,672 A | 6/1981 | Vassiliades |
| 4,285,720 A | 8/1981 | Scher |
| 4,418,346 A | 11/1983 | Batchelder |
| 4,419,383 A | 12/1983 | Lee |
| 4,643,854 A | 2/1987 | Kendall, Jr. et al. |
| 4,888,140 A | 12/1989 | Schlameus et al. |
| 4,917,885 A | 4/1990 | Chiba et al. |
| 4,936,916 A | 6/1990 | Shinmitsu et al. |
| 4,960,351 A | 10/1990 | Kendall, Jr. et al. |
| 5,040,960 A | 8/1991 | Shioya et al. |
| 5,216,530 A | 6/1993 | Pearlman et al. |
| 5,260,002 A | 11/1993 | Wang |
| 5,378,404 A | 1/1995 | Han et al. |
| 5,556,583 A | 9/1996 | Tashiro et al. |
| 5,614,217 A | 3/1997 | Chiprich et al. |
| 5,641,510 A | 6/1997 | Clark et al. |
| 5,736,074 A | 4/1998 | Hayes et al. |
| 5,745,094 A | 4/1998 | Gordon, II et al. |
| 5,760,761 A | 6/1998 | Sheridon |
| 5,777,782 A | 7/1998 | Sheridon |
| 5,808,783 A | 9/1998 | Crowley |
| 5,872,552 A | 2/1999 | Gordon, II et al. |
| 5,882,680 A | 3/1999 | Suzuki et al. |
| 5,891,212 A | 4/1999 | Tang et al. |
| 5,930,026 A | 7/1999 | Jacobson et al. |
| 5,961,804 A | 10/1999 | Jacobson et al. |
| 6,017,584 A | 1/2000 | Albert et al. |
| 6,054,071 A | 4/2000 | Mikkelsen, Jr. |
| 6,055,091 A | 4/2000 | Sheridon et al. |
| 6,067,185 A | 5/2000 | Albert et al. |
| 6,097,531 A | 8/2000 | Sheridon |
| 6,103,271 A | 8/2000 | Morrison et al. |
| 6,118,426 A | 9/2000 | Albert et al. |
| 6,119,953 A | 9/2000 | Ganan-Calvo et al. |
| 6,120,588 A | 9/2000 | Jacobson |
| 6,120,839 A | 9/2000 | Comiskey et al. |
| 6,124,851 A | 9/2000 | Jacobson |
| 6,128,124 A | 10/2000 | Silverman |
| 6,130,773 A | 10/2000 | Jacobson et al. |
| 6,130,774 A | 10/2000 | Albert et al. |
| 6,137,467 A | 10/2000 | Sheridon et al. |
| 6,144,361 A | 11/2000 | Gordon, II et al. |
| 6,147,791 A | 11/2000 | Sheridon |
| 6,172,798 B1 | 1/2001 | Albert et al. |
| 6,177,921 B1 | 1/2001 | Comiskey et al. |
| 6,184,856 B1 | 2/2001 | Gordon, II et al. |
| 6,214,300 B1 | 4/2001 | Morrison et al. |
| 6,225,971 B1 | 5/2001 | Gordon, II et al. |
| 6,232,950 B1 | 5/2001 | Albert et al. |
| 6,241,921 B1 | 6/2001 | Jacobson et al. |
| 6,249,271 B1 | 6/2001 | Albert et al. |
| 6,252,564 B1 | 6/2001 | Albert et al. |
| 6,262,706 B1 | 7/2001 | Albert et al. |
| 6,262,833 B1 | 7/2001 | Loxley et al. |
| 6,271,823 B1 | 8/2001 | Gordon, II et al. |
| 6,300,932 B1 | 10/2001 | Albert |
| 6,301,038 B1 | 10/2001 | Fitzmaurice et al. |
| 6,312,304 B1 | 11/2001 | Duthaler et al. |
| 6,312,971 B1 | 11/2001 | Amundson et al. |
| 6,323,989 B1 | 11/2001 | Jacobson et al. |
| 6,327,072 B1 | 12/2001 | Comiskey et al. |
| 6,376,828 B1 | 4/2002 | Comiskey |
| 6,377,387 B1 | 4/2002 | Duthaler et al. |
| 6,392,785 B1 | 5/2002 | Albert et al. |
| 6,392,786 B1 | 5/2002 | Albert |
| 6,413,790 B1 | 7/2002 | Duthaler et al. |
| 6,422,687 B1 | 7/2002 | Jacobson |
| 6,445,374 B1 | 9/2002 | Albert et al. |
| 6,445,489 B1 | 9/2002 | Jacobson et al. |
| 6,459,418 B1 | 10/2002 | Comiskey et al. |
| 6,473,072 B1 | 10/2002 | Comiskey et al. |
| 6,480,182 B1 | 11/2002 | Turner et al. |
| 6,498,114 B1 | 12/2002 | Amundson et al. |
| 6,504,524 B1 | 1/2003 | Gates et al. |
| 6,506,438 B1 | 1/2003 | Duthaler et al. |
| 6,512,354 B1 | 1/2003 | Jacobson et al. |
| 6,515,649 B1 | 2/2003 | Albert et al. |
| 6,515,790 B1 | 2/2003 | Miyamoto et al. |
| 6,518,949 B1 | 2/2003 | Drzaic |
| 6,521,489 B1 | 2/2003 | Duthaler et al. |
| 6,531,997 B1 | 3/2003 | Gates et al. |
| 6,535,197 B1 | 3/2003 | Comiskey et al. |
| 6,538,801 B1 | 3/2003 | Jacobson et al. |
| 6,545,291 B1 | 4/2003 | Amundson et al. |
| 6,580,545 B1 | 6/2003 | Morrison et al. |
| 6,639,578 B1 | 10/2003 | Comiskey et al. |
| 6,652,075 B1 | 11/2003 | Jacobson |
| 6,657,772 B1 | 12/2003 | Loxley |
| 6,664,944 B1 | 12/2003 | Albert et al. |
| D485,294 S | 1/2004 | Albert |
| 6,672,921 B1 | 1/2004 | Liang et al. |
| 6,680,725 B1 | 1/2004 | Jacobson |
| 6,683,333 B1 | 1/2004 | Kazlas et al. |
| 6,693,620 B1 | 2/2004 | Herb et al. |
| 6,704,133 B1 | 3/2004 | Gates et al. |
| 6,710,540 B1 | 3/2004 | Albert et al. |
| 6,721,083 B1 | 4/2004 | Jacobson et al. |
| 6,724,519 B1 | 4/2004 | Comiskey et al. |
| 6,727,881 B1 | 4/2004 | Albert et al. |
| 6,738,050 B1 | 5/2004 | Comiskey et al. |
| 6,750,473 B1 | 6/2004 | Amundson et al. |
| 6,753,999 B1 | 6/2004 | Zehner et al. |
| 6,788,449 B1 | 9/2004 | Liang et al. |
| 6,816,147 B1 | 11/2004 | Albert |
| 6,819,471 B1 | 11/2004 | Amundson et al. |
| 6,822,782 B1 | 11/2004 | Honeyman et al. |
| 6,825,068 B1 | 11/2004 | Denis et al. |
| 6,825,829 B1 | 11/2004 | Albert et al. |
| 6,825,970 B1 | 11/2004 | Goenaga et al. |
| 6,831,769 B1 | 12/2004 | Holman et al. |
| 6,839,158 B1 | 1/2005 | Albert et al. |
| 6,842,167 B1 | 1/2005 | Albert et al. |
| 6,842,657 B1 | 1/2005 | Drzaic et al. |
| 6,864,875 B1 | 3/2005 | Drzaic et al. |
| 6,865,010 B1 | 3/2005 | Duthaler et al. |
| 6,866,760 B1 | 3/2005 | Paolini Jr. et al. |
| 6,870,657 B1 | 3/2005 | Fitzmaurice et al. |
| 6,870,661 B1 | 3/2005 | Pullen et al. |
| 6,900,851 B1 | 5/2005 | Morrison et al. |
| 6,950,220 B1 | 9/2005 | Abramson et al. |
| 6,958,848 B1 | 10/2005 | Cao et al. |
| 2002/0060321 A1 | 5/2002 | Kazlas et al. |
| 2002/0063661 A1 | 5/2002 | Comiskey et al. |
| 2002/0090980 A1 | 7/2002 | Wilcox et al. |
| 2002/0113770 A1 | 8/2002 | Jacobson et al. |
| 2002/0130832 A1 | 9/2002 | Baucom et al. |
| 2002/0180687 A1 | 12/2002 | Webber |
| 2003/0011560 A1 | 1/2003 | Albert et al. |
| 2003/0020844 A1 | 1/2003 | Albert et al. |
| 2003/0102858 A1 | 6/2003 | Jacobson et al. |
| 2003/0132908 A1 | 7/2003 | Herb et al. |

| | | | |
|---|---|---|---|
| 2003/0151702 | A1 | 8/2003 | Morrison et al. |
| 2003/0222315 | A1 | 12/2003 | Amundson et al. |
| 2004/0014265 | A1 | 1/2004 | Kazlas et al. |
| 2004/0027327 | A1 | 2/2004 | LeCain et al. |
| 2004/0119681 | A1 | 6/2004 | Albert et al. |
| 2005/0035941 | A1 | 2/2005 | Albert et al. |

FOREIGN PATENT DOCUMENTS

| | | |
|---|---|---|
| WO | WO 99/30812 | 6/1999 |
| WO | WO 99/30834 | 9/1999 |
| WO | WO 00/05704 | 2/2000 |
| WO | WO 00/36560 | 6/2000 |
| WO | WO 00/38000 | 6/2000 |
| WO | WO 00/67110 | 11/2000 |
| WO | WO 00/67327 | 11/2000 |
| WO | WO 01/07961 | 2/2001 |
| WO | WO 01/27690 | 4/2001 |

OTHER PUBLICATIONS

Au, J. et al., "Ultra-Thin 3.1-in. Active-Matrix Electronic Ink Display for Mobile Devices", IDW'02, 223 (2002).
Bach, U., et al., "Nanomaterials-Based Electrochromics for Paper-Quality Displays", Adv. Mater., 14(11), 845 (2002).
Brenn, G., et al., "A new apparatus for the production of monodisperse sprays at high flow rates", Chem. Eng. Sci., 52, 237 (1997).
Brenn, G., et al., "Monodisperse Sprays for Various Purposes—Their Production and Characteristics", Part. Part. Syst. Charact., 13, 179 (1996).
Caillot, E. et al. "Active Matrix Electrophoretic Information Display for High Performance Mobile Devices", IDMC Proceedings (2003).
Chen, Y., et al., "A Conformable Electronic Ink Display using a Foil-Based a-Si TFT Array", SID 01 Digest, 157 (Jun. 2001).
Comiskey, B., et al., "An electrophoretic ink for all-printed reflective electronic displays", Nature, 394, 253 (1998).
Comiskey, B., et al., "Electrophoretic Ink: A Printable Display Material", SID 97 Digest (1997), p. 75.
Danner, G.M. et al., "Reliability Performance for Microencapsulated Electrophoretic Displays with Simulated Active Matrix Drive", SID 03 Digest, 573 (2003).
Drzaic, P., et al., "A Printed and Rollable Bistable Electronic Display", SID 98 Digest (1998), p. 1131.
Duthaler, G., et al., "Active-Matrix Color Displays Using Electrophoretic Ink and Color Filters", SID 02 Digest, 1374 (2002).
Ganan-Calvo, A.M., "Generation of Steady Liquid Microthreads and Micron-Sized Monodisperse Sprays in Gas Streams", Phys. Rev. Lett., 80, 285 (1998).
Gutcho, M.H., Microcapsules and Microencapsulation Techniques, Noyes Data Corp., Park Ridge NJ, (1976).
Henzen, A. et al., "Development of Active Matrix Electronic Ink Displays for Handheld Devices", SID 03 Digest, 176, (2003).
Henzen, A. et al., "Development of Active Matrix Electronic Ink Displays for Smart Handheld Applications", IDW'02, 227 (2002).
Jacobson, J., et al., "The last book", IBM Systems J., 36, 457 (1997).
Jo, G-R, et al., "Toner Display Based on Particle Movements", Chem. Mater, 14, 664 (2002).
Kazlas, P. et al., "Card-size Active-matrix Electronic Ink Display", Eurodisplay 2002, 259 (2002).
Kazlas, P., et al., "12.1" SVGA Microencapsulated Electrophoretic Active Matrix Display for Information Applicances, SID 01 Digest, 152 (Jun. 2001).
Kitamura, T., et al., "Electrical toner movement for electronic paper-like display", Asia Display/IDW '01, p. 1517, Paper HCS1-1 (2001).
Matsumoto, S., et al., "Generation of Monodispersed Concentric Two Phase Droplets for Encapsulation," ICLASS-'82, Reports & Proc, 2nd Int. Conf. on Liquid Atomization & Spray Systems, pp. 63-67 (1982).
Nakamura, E., et al., "Development of Electrophoretic Display Using Microcapsulated Suspension," SID 98 Digest (1998), p. 1014.
O'Regan, B. et al., "A Low Cost, High-efficiency Solar Cell Based on Dye-sensitized colloidal $TiO_2$ Films", Nature, vol. 353, Oct. 24, 1991, 773-740.
Ota, I., et al., "Developments in Electrophoretic Displays", Proceedings of the SID, 18, 243 (1977).
Pitt, M.G., et al., "Power Consumption of Microencapsulated Electrophoretic Displays for Smart Handheld Applications", SID 02 Digest, 1378 (2002).
Vandegaer, J.E. (ed.), "Microencapsulation Processes and Applications", pp. v-x, 1-180 (Plenum Press, New York 1974).
Wang, G. and Harrison, A., "Preparation of Iron Particles Coated with Silica", Journal of Colloid and Interface Science, 1999, 217, 203.
Webber, R., "Image Stability in Active-Matrix Microencapsulated Electrophoretic Displays", SID 02 Digest, 126 (2002).
Wood, D., "An Electrochromic Renaissance?" Information Display, 18(3), 24 (Mar. 2002).
Yamaguchi, Y., et al., "Toner display using insulative particles charged triboelectrically", Asia Display/IDW '01, p. 1729, Paper AMD4-4 (2001).
Zehner, R. et al., "Drive Waveforms for Active Matrix Electrophoretic Displays", SID 03 Digest, 842 (2003).

CAPSULES, MATERIALS FOR USE THEREIN AND ELECTROPHORETIC MEDIA AND DISPLAYS CONTAINING SUCH CAPSULES

CROSS REFERENCE TO RELATED APPLICATIONS

This application is a divisional of application Ser. No. 10/249,966, filed May 22, 2003 now abandoned (Publication No. 2004/0012839), which claims priority from (a) application Ser. No. 60/319,265, filed May 23, 2002; (b) application Ser. No. 60/319,342, filed Jun. 24, 2002; and (c) application Ser. No. 60/319,343, filed Jun. 24, 2002.

This application is also related to (d) application Ser. No. 10/063,803, filed May 15, 2002 (Publication No. 2002/0185,378, now U.S. Pat. No. 6,822,782); (e) copending application Ser. No. 10/063,236, filed Apr. 2, 2002 (Publication No. 2002/0180687); and (f) application Ser. No. 10/063,655, filed May 7, 2002 (Publication No. 2002/0171190, now U.S. Pat. No. 6,870,661). The entire contents of all these applications, and of all U.S. patents and published applications mentioned below, are herein incorporated by reference.

BACKGROUND OF INVENTION

This invention relates to capsules and materials for use therein. The capsules of the present invention are especially, but not exclusively, intended for use in electrophoretic displays. This invention also relates to binders for use in electrophoretic displays. This invention also relates to processes for forming electrophoretic media and displays, and to the media and displays so formed.

Electrophoretic displays have been the subject of intense research and development for a number of years. Such displays can have attributes of good brightness and contrast, wide viewing angles, state bistability, and low power consumption when compared with liquid crystal displays. (The terms "bistable" and "bistability" are used herein in their conventional meaning in the art to refer to displays comprising display elements having first and second display states differing in at least one optical property, and such that after any given element has been driven, by means of an addressing pulse of finite duration, to assume either its first or second display state, after the addressing pulse has terminated, that state will persist for at least several times, for example at least four times, the minimum duration of the addressing pulse required to change the state of the display element.) Nevertheless, problems with the long-term image quality of these displays have prevented their widespread usage. For example, particles that make up electrophoretic displays tend to settle, resulting in inadequate service-life for these displays.

Numerous patents and applications assigned to or in the names of the Massachusetts Institute of Technology (MIT) and E Ink Corporation have recently been published describing encapsulated electrophoretic media. Such encapsulated media comprise numerous small capsules, each of which itself comprises an internal phase containing electrophoretically-mobile particles suspended in a liquid suspension medium, and a capsule wall surrounding the internal phase. Typically, the capsules are themselves held within a polymeric binder to form a coherent layer positioned between two electrodes. Encapsulated media of this type are described, for example, in U.S. Pat. Nos. 5,930,026; 5,961, 804; 6,017,584; 6,067,185; 6,118,426; 6,120,588; 6,120, 839; 6,124,851; 6,130,773; 6,130,774; 6,172,798; 6,177, 921; 6,232,950; 6,249,271; 6,252,564; 6,262,706; 6,262, 833; 6,300,932; 6,312,304; 6,312,971; 6,323,989; 6,327, 072; 6,376,828; 6,377,387; 6,392,785; 6,392,786; 6,413, 790; 6,422,687; 6,445,374; 6,445,489; 6,459,418; 6,473, 072; 6,480,182; 6,498,114; 6,504,524; 6,506,438; 6,512, 354; 6,515,649; 6,518,949; 6,521,489; 6,531,997; 6,535, 197; 6,538,801; and 6,545,291; and U.S. patent applications Publication Nos. 2002/0019081; 2002/0021270; 2002/ 0053900; 2002/0060321; 2002/0063661; 2002/0063677; 2002/0090980; 2002/0106847; 2002/0113770; 2002/ 0130832; 2002/0131147; 2002/0145792; 2002/0154382, 2002/0171910; 2002/0180687; 2002/0180688; 2002/ 0185378; 2003/0011560; 2003/0011867; 2003/0011868; 2003/0020844; 2003/0025855; 2003/0034949; 2003/ 0038755; and 2003/0053189; and International Applications Publication Nos. WO 99/67678; WO 00/05704; WO 00/20922; WO 00/26761; WO 00/38000; WO 00/38001; WO 00/36560; WO 00/67110; WO 00/67327; WO 01/07961; and WO 01/08241.

Known electrophoretic media, both encapsulated and unencapsulated, can be divided into two main types, referred to hereinafter for convenience as "single particle" and "dual particle" respectively. A single particle medium has only a single type of electrophoretic particle suspending in a colored suspending medium, at least one optical characteristic of which differs from that of the particles. (In referring to a single type of particle, we do not imply that all particles of the type are absolutely identical. For example, provided that all particles of the type possess substantially the same optical characteristic and a charge of the same polarity, considerable variation in parameters such as particle size and electrophoretic mobility can be tolerated without affecting the utility of the medium.) The optical characteristic is typically color visible to the human eye, but may, alternatively or in addition, be any one of more of reflectivity, retroreflectivity, luminescence, fluorescence, phosphorescence, or color in the broader sense of meaning a difference in absorption or reflectance at non-visible wavelengths. When such a medium is placed between a pair of electrodes, at least one of which is transparent, depending upon the relative potentials of the two electrodes, the medium can display the optical characteristic of the particles (when the particles are adjacent the electrode closer to the observer, hereinafter called the "front" electrode) or the optical characteristic of the suspending medium (when the particles are adjacent the electrode remote from the observer, hereinafter called the "rear" electrode, so that the particles are hidden by the colored suspending medium).

A dual particle medium has two different types of particles differing in at least one optical characteristic and a suspending fluid which may be uncolored or colored, but which is typically uncolored. The two types of particles differ in electrophoretic mobility; this difference in mobility may be in polarity (this type may hereinafter be referred to as an "opposite charge dual particle" medium) and/or magnitude. When such a dual particle medium is placed between the aforementioned pair of electrodes, depending upon the relative potentials of the two electrodes, the medium can display the optical characteristic of either set of particles, although the exact manner in which this is achieved differs depending upon whether the difference in mobility is in polarity or only in magnitude. For ease of illustration, consider an electrophoretic medium in which one type of particles is black and the other type white. If, the two types of particles differ in polarity (if, for example, the black particles are positively charged and the white particles negatively charged), the particles will be attracted to the two different electrodes, so that if, for example, the front electrode is negative relative to the rear electrode, the black particles will be attracted to the front electrode and the white particles to the rear electrode, so that the medium will appear black to the observer. Conversely, if the front electrode is positive relative to the rear electrode, the white particles will be attracted to the front electrode and the black particles to the rear electrode, so that the medium will appear white to the observer.

If the two types of particles have charges of the same polarity, but differ in electrophoretic mobility (this type of medium may hereinafter to referred to as a "same polarity dual particle" medium), both types of particles will be attracted to the same electrode, but one type will reach the electrode before the other, so that the type facing the observer differs depending upon the electrode to which the particles are attracted. For example suppose the previous illustration is modified so that both the black and white particles are positively charged, but the black particles have the higher electrophoretic mobility. If now the front electrode is negative relative to the rear electrode, both the black and white particles will be attracted to the front electrode, but the black particles, because of their higher mobility will reach it first, so that a layer of black particles will coat the front electrode and the medium will appear black to the observer. Conversely, if the front electrode is positive relative to the rear electrode, both the black and white particles will be attracted to the rear electrode, but the black particles, because of their higher mobility will reach it first, so that a layer of black particles will coat the rear electrode, leaving a layer of white particles remote from the rear electrode and facing the observer, so that the medium will appear white to the observer: note that this type of dual particle medium requires that the suspending fluid to sufficiently transparent to allow the layer of white particles remote from the rear electrode to be readily visible to the observer. Typically, the suspending fluid in a dual particle display is not colored at all, but some color may be incorporated for the purpose of correcting any undesirable tint in the white particles seen therethrough.

Both single and dual particle electrophoretic displays may be capable of intermediate gray states having optical characteristics intermediate the two extreme optical states already described. It is shown in the aforementioned application Ser. No. 10/063,236 that some electrophoretic displays are stable not only in their extreme optical states but also in their intermediate gray states. This type of display is properly called "multi-stable" rather than bistable, but the latter term may be used herein for convenience.

Some of the aforementioned patents and published applications disclose encapsulated electrophoretic media having three or more different types of particles within each capsule. For purposes of the present application, such multi-particle media are regarded as sub-species of dual particle media.

Also, many of the aforementioned patents and applications recognize that the walls surrounding the discrete microcapsules in an encapsulated electrophoretic medium could be replaced by a continuous phase, thus producing a so-called polymer-dispersed electrophoretic display in which the electrophoretic medium comprises a plurality of discrete droplets of an electrophoretic fluid and a continuous phase of a polymeric material, and that the discrete droplets of electrophoretic fluid within such a polymer-dispersed electrophoretic display may be regarded as capsules or microcapsules even though no discrete capsule membrane is associated with each individual droplet; see for example, the aforementioned 2002/0131147. Accordingly, for purposes of the present application, such polymer-dispersed electrophoretic media are regarded as sub-species of encapsulated electrophoretic media.

An encapsulated electrophoretic display typically does not suffer from the clustering and settling failure mode of traditional electrophoretic devices and provides further advantages, such as the ability to print or coat the display on a wide variety of flexible and rigid substrates. (Use of the word "printing" is intended to include all forms of printing and coating, including, but without limitation: pre-metered coatings such as patch die coating, slot or extrusion coating, slide or cascade coating, curtain coating; roll coating such as knife over roll coating, forward and reverse roll coating; gravure coating; dip coating; spray coating; meniscus coating; spin coating; brush coating; air knife coating; silk screen printing processes; electrostatic printing processes; thermal printing processes; ink jet printing processes; and other similar techniques.) Thus, the resulting display can be flexible. Further, because the display medium can be printed (using a variety of methods), the display itself can be made inexpensively. Present day electrophoretic displays exhibit paper-like reflective optics, extremely low power consumption due to retained image capability, and mechanical conformability and flexibility.

Although electrophoretic displays are often opaque (since the particles substantially block transmission of visible light through the display) and operate in a reflective mode, electrophoretic displays can be made to operate in a so-called "shutter mode" in which the particles are arranged to move laterally within the display so that the display has one display state which is substantially opaque and one which is light-transmissive. See, for example, the aforementioned U.S. Pat. Nos. 6,130,774 and 6,172,798, and U.S. Pat. Nos. 5,872,552; 6,144,361; 6,271,823; 6,225,971; and 6,184,856. Dielectrophoretic displays, which are similar to electrophoretic displays but rely upon variations in electric field strength, can operate in a similar mode; see U.S. Pat. No. 4,418,346. Other types of electro-optic displays may also be capable of operating in shutter mode.

However, the environments in which an encapsulated electrophoretic display can be used is determined, at least in part, by the characteristics of the materials used to form the walls of the microcapsules present in the display, and prior art microcapsules do have some limitations in this regard. The aforementioned applications Ser. Nos. 10/063,803, 10/063,236 and 10/063,655 describe formation of microcapsule walls by coacervation of gelatin and acacia, followed by cross-linking with glutaraldehyde. The resulting microcapsules have an operating temperature range of about +10 to +60° C., may burst at temperatures near the upper end of this range, and are sufficiently sensitive to humidity that the optical performance of the electrophoretic displays is adversely affected at combinations of high temperature and high humidity such as might be encountered in a tropical rain forest environment. Although it might at first appear that such microcapsules could be made to operate at higher temperatures simply by increasing the thickness of the microcapsule wall, increased wall thickness may result in poorly packed films of the microcapsules and/or less deformable microcapsules, and both these effects are disadvantageous in electrophoretic media, as discussed in more detail below. Accordingly, there is a need for improved microcapsule wall materials to expand the operating limits of such electrophoretic displays. In particular, there is a need for improved microcapsule wall materials which will permit electrophoretic displays to operate satisfactorily at extreme temperature and humidity, and thus meet the high performance needs of military and commercial mobile device applications.

However, the search for new microcapsule wall materials useful in electrophoretic and similar displays is complicated by the need for the material to meet the numerous requirements necessary in practical production of such displays. Among the requirements are:

(a) The encapsulation procedure must be reproducible and manufacturable, involve inexpensive raw materials, and yield capsules that are totally impermeable to their contents;

(b) The microcapsules must be amenable to coating. While the properties of a microencapsulated dispersion that allow facile, uniform coating are not entirely understood, one property that is important is flexibility of the capsule wall. If the wall is too rigid, the coating suspension shows severe shear-thickening rheological behavior, and is either impossible to coat because of hopper jamming or yields very non-uniform coatings. Flexibility of the capsule wall also allows closer packing in the coating, and thus yields displays with improved optical properties;

(c) The capsule wall must have mechanical, optical, and electrical properties that allow the construction of a durable display with rapid response at low driving voltages. In particular, the shell must be tolerant to mechanical deformation (this is especially important for flexible display applications) and must not be appreciably colored or opaque. Also, the electrical resistance of the shell wall material must be high; a capsule wall with poor electrical properties can short out the display; and (d) The capsule wall must maintain its properties over a wide range of operating conditions. The response of the capsule to changes in humidity is especially problematical, since it has been found to be difficult to achieve simultaneously all of the characteristics listed above with a capsule wall composition whose electrical conductivity is sufficiently insensitive to high ambient humidity. Improvements in the environmental sensitivity of the capsule wall represent a major contribution to the robustness of the display.

Furthermore, most microencapsulation techniques known in the literature are intended for controlled release of the capsule contents, so that the microcapsule is intended to break or become selectively permeable in use. Hence, materials developed for other types of microcapsules may not be useful for microcapsules to be used in electrophoretic displays, where capsules must perform in ways that are highly atypical, in that they are intended to provide permanent encapsulation of their contents.

As described in the aforementioned MIT and E Ink patents and published applications, a microencapsulated electrophoretic medium is typically formed by mixing microcapsules with a solution containing a polymer binder, laying down a layer of the resultant microcapsule/binder solution mixture on a substrate, and drying the layer to produce an electrophoretic medium in which the microcapsules are embedded in a layer of the polymer binder. The substrate bearing the electrophoretic medium is then typically laminated, using a lamination adhesive to a backplane arranged to apply drive voltages to the medium. The binder improves the mechanical integrity of the layer of microcapsules, and may improve the adhesion of the microcapsules to the substrate on which they are deposited. It has now been found that the sensitivity of electrophoretic media to humidity can be significantly reduced by modifying the binder and/or the lamination adhesive rather than the material used to form the microcapsules walls.

It is also desirable to reduce the operating voltage of microencapsulated electrophoretic displays. Considerable progress has already been made in this regard; some of the early displays described in the aforementioned E Ink and MIT patents and applications needed to be operated at 90 V, whereas similar displays can now operate at only 15 V. However, further reduction in operating voltage is still desirable, because reducing the operating voltage reduces the energy consumption of the display, an important factor in displays intended for portable devices. Also, when it is desired to drive a display using dry cells or similar small batteries, which only generate (say) 1.5 to 6 V DC, even operating a display at 15 V requires the provision of special circuitry to step up the DC voltage produced by the battery to that required by the display. If the operating voltage of the display could be reduced to that produced by the battery, this circuitry could be eliminated and the cost of the display reduced.

As already mentioned, in an encapsulated electrophoretic display the microcapsules which form the electrophoretic medium are typically enclosed in a binder. The microcapsules/binder layer is typically sandwiched between two electrodes (or, in some cases, between an electrode and a non-electrode support member, a movable electrode being moved over the support member to address the display), it normally also being necessary to include a layer of a lamination adhesive between the electrodes to ensure the mechanical integrity of the display. A potential difference is applied between the electrodes to address the display. Since the switching of an electrophoretic medium is dependent upon the electric field across the medium, the operating voltage required by a display can be reduced by reducing the thickness of the microcapsules/binder layer, since a thinner layer enables the same electric field, and hence the same electro-optic response of the microcapsules, to be produced at a lower operating voltage.

A further problem with some electrophoretic displays is the phenomenon known as "self-erasing"; see, for example, Ota, I., et al., "Developments in Electrophoretic Displays", Proceedings of the SID, 18, 243 (1977), where self-erasing was reported in an unencapsulated electrophoretic display. When the voltage applied across certain electrophoretic displays is switched off, the electrophoretic medium may reverse its optical state, and in some cases a reverse voltage, which may be larger than the operating voltage, can be observed to occur across the electrodes. It appears (although this invention is in no way limited by this belief) that the self-erasing phenomenon is due to a mismatch in electrical properties between various components of the display; in particular, in the case of an encapsulated electrophoretic display, it appears that the phenomenon is due to a mismatch in electrical properties between the internal phase of the microcapsules and the polymer layer, namely the microcapsule walls, which is in electrical series with this internal phase. Obviously, self-erasing is highly undesirable in that it reverses (or otherwise distorts, in the case of a grayscale display) the desired optical state of the display.

Another problem sometimes encountered with encapsulated electrophoretic displays is that, after the display has been operating for an extended period, the electrophoretic particles may tend to stick to the interior surfaces of the microcapsules, thus ceasing to move when an electric field is applied to the display and the optical contrast between the optical states of the display.

The present invention seeks to provides capsule wall materials, capsules, and encapsulated electrophoretic media and displays, in which the aforementioned problems are reduced or eliminated, and which thus expand the operating range of electrophoretic displays. The capsule wall materials provided by the present invention may be useful for encapsulation of materials other than electrophoretic media, for example pharmaceuticals.

SUMMARY OF INVENTION

Accordingly, in one aspect this invention provides an encapsulation material comprising the coacervation product of a polyanionic polymer having a vinyl main chain and a plurality of anionic groups bonded to the main chain, with a cationic or zwitterionic water-soluble polymer capable of forming an immiscible second phase on contact with the polyanionic polymer.

This aspect of the invention may hereinafter for convenience be referred to as the "polyanionic-based encapsulation material" of the invention.

In this encapsulation material, the cationic water-soluble polymer may comprises a protein, preferably gelatin. The encapsulation material may be cross-linked with an aldehyde, for example glutaraldehyde. The anionic groups may be, for example, any one or more of sulfate, sulfonate, phosphate, carboxylic acid and carboxylate groups.

A preferred group of polymers for use in the polyanionic-based encapsulation material of the invention are those of the formula:

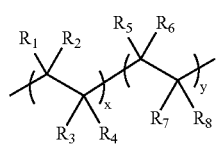

(I)

where x and y are the mole fractions of the two monomer residues in the polymer and total 1, one or more of $R_1$ to $R_8$ is an anionic group, and those of $R_1$ to $R_8$ which are not anionic groups are hydrogen, saturated hydrocarbon groups, groups of the formula —$OR_9$ or —$COOR_{10}$ (wherein $R_9$ and $R_{10}$ are hydrocarbon groups), aryl, substituted aryl or halocarbon groups. Among this group of polyanionic polymers, preferred sub-groups are those containing a group of formula —$OR_9$ derived from a vinyl ether or vinyl carboxylate ester, those containing a group of formula —$COOR_{10}$ derived from an acrylate or methacrylate ester, those in which at least one of the groups $R_1$ to $R_8$ is a styrene sulfonic acid or styrene sodium sulfonate group, and those in which at least one of the groups $R_1$ to $R_8$ is a vinyl chloride or vinylidene chloride grouping. The polyanionic polymer may, for example, comprise any one or more of poly(acrylic acid); poly(methacrylic acid); copolymers of poly(acrylic acid) and/or poly(methacrylic acid) with esters of the same acids; styrene sulfonate copolymers with styrene; methyl vinyl ether or vinyl acetate copolymers with (meth)acrylic acid; copolymers of alkyl-substituted olefins, methyl vinyl ether and vinyl carboxylate with maleic acid, maleic esters, and maleic half ester, half acids.

The present invention also provides a capsule having an internal phase and a wall formed from a polyanionic-based encapsulation material of the invention. In this capsule, the internal phase may comprise a liquid, preferably a liquid hydrocarbon, alone or in combination with a halocarbon. The internal phase may also comprise a plurality of charged particles capable of moving through the liquid on application of an electric field to the capsule.

The present invention also provides a process for encapsulating a internal phase, which process comprises contacting the internal phase with a polyanionic polymer having a vinyl main chain and a plurality of anionic groups bonded to the main chain and with a cationic or zwitterionic water-soluble polymer capable of forming an immiscible second phase on contact with the polyanionic polymer. the contact being effected under conditions effective to cause formation around the internal phase of a capsule wall comprising a coacervation product of the two polymers. Desirably, this process also comprises cross-linking the capsule wall with an aldehyde, for example, glutaraldehyde.

The present invention also provides an electrophoretic medium comprising a plurality of capsules, each capsule comprising a plurality of charged particles suspended in a suspending fluid and capable of moving through the fluid on application of an electric field to the capsule, each capsule further comprising a wall surrounding the charged particles and the suspending fluid, the wall comprising a polyanionic-based encapsulation material of the present invention.

The present invention also provides an electrophoretic display comprising a layer of an electrophoretic medium of the invention as defined above, and at least one electrode disposed adjacent the electrophoretic medium and arranged to apply an electric field thereto.

In another aspect, this invention provides an electrophoretic medium comprising a plurality of capsules in a polymeric binder. Each capsule comprises a capsule wall and an internal phase encapsulated by the capsule wall, the internal phase comprising a suspending fluid and a plurality of electrically charged particles suspended in the suspending fluid and capable of moving therethrough upon application of an electric field to the capsule. The polymeric binder is a water soluble polymer, preferably gelatin. This aspect of the invention may hereinafter called the "water soluble binder" electrophoretic medium.

In such a water soluble binder electrophoretic medium, the water soluble polymer may comprise gelatin, preferably in the form of coacervate of gelatin and acacia.

In another aspect, the invention provides a capsule comprising a capsule wall and an internal phase encapsulated by the capsule wall, the internal phase comprising a suspending fluid and a plurality of electrically charged particles suspended in the suspending fluid and capable of moving therethrough upon application of an electric field to the capsule. The capsule wall is formed of a material which is swellable by the suspending fluid. This aspect of the invention may hereinafter called the "swellable wall" capsule.

In such a swellable wall capsule, the internal phase may comprise a hydrocarbon and the capsule wall material comprise any one or more of a silicone, a polymer derived from a vinylic monomer, and a polyurethane. For example, the capsule wall material may comprise any one or more of poly(dimethyl siloxane), poly(trifluorobutyl methyl siloxane), poly(vinyl chloride), poly(butadiene), a polyacrylate, and a polymethacrylate. Also, in a swellable wall capsule, for reasons described in detail below, the internal surface of the capsule wall may bear at least one polymer chain which is solvated by the suspending fluid. In one form of such a capsule, the internal phase comprises a hydrocarbon and the polymer chain has a main chain and a plurality of side chains extending from the main chain, each of the side chains comprising at least about four carbon atoms.

This invention extends to an electrophoretic medium comprising a plurality of swellable wall capsules and a binder surrounding the capsules. Desirably, the binder is substantially not swellable by the suspending fluid. If, as is commonly the case, the electrophoretic medium also comprises a layer of an adhesive, this adhesive is desirably not substantially swellable by the suspending fluid.

In another aspect, the invention provides an electrophoretic medium comprising a plurality of capsules in a polymeric binder. Each capsule comprises a capsule wall and an internal phase encapsulated by the capsule wall, the internal phase comprising a suspending fluid and a plurality of electrically charged particles suspended in the suspending fluid and capable of moving therethrough upon application of an electric field to the capsule. The electrophoretic medium may optionally comprise a layer of a lamination adhesive in contact with the binder. In this aspect of the present invention, at least one of the polymeric binder and lamination adhesive is formed from a blend of two (or more) materials, preferably polymers, the blend having lower changes in volume resistivity with humidity than either component separately. This aspect of the invention may hereinafter called the "mixed binder/adhesive" electrophoretic medium.

In such a mixed binder/adhesive electrophoretic medium, the blend may comprise a plurality of polyurethanes.

Finally, in another aspect, this invention provides a process for forming a capsule. This process comprises:

providing a liquid internal phase comprising a fluid and a first prepolymer dispersed therein and having a plurality of first reactive groups;

providing a dispersion medium substantially immiscible with the internal phase and comprising a dispersing liquid and a second prepolymer dispersed therein and having a plurality of second reactive groups, each of the second reactive groups being capable of reacting with at least one of the first reactive groups; and dispersing the internal phase as a plurality of discrete droplets in the dispersion medium, thereby causing the first and second reactive groups to react together to form a polymer shell surrounding the droplets, and thereby forming capsules comprising the fluid.

This process may hereinafter be called the "two prepolymer" process of the invention. In one form of such a two prepolymer process, the internal phase further comprises a plurality of electrically charged particles capable of moving through the internal phase upon application of an electric field thereto.

In the two prepolymer process, the dispersion medium may be an aqueous medium and the internal phase an organic medium. The two reactive groups may comprise an acid anhydride grouping and an amine group, which react together to form amide linkages. An example of two prepolymers containing such reactive groups are poly(isoprene-graft-maleic anhydride) and polyethyleneimine.

BRIEF DESCRIPTION OF DRAWINGS

Preferred embodiments of the present invention will now be described, though by way of illustration only, with reference to the accompanying drawings, in which.

DETAILED DESCRIPTION

Figure 1:
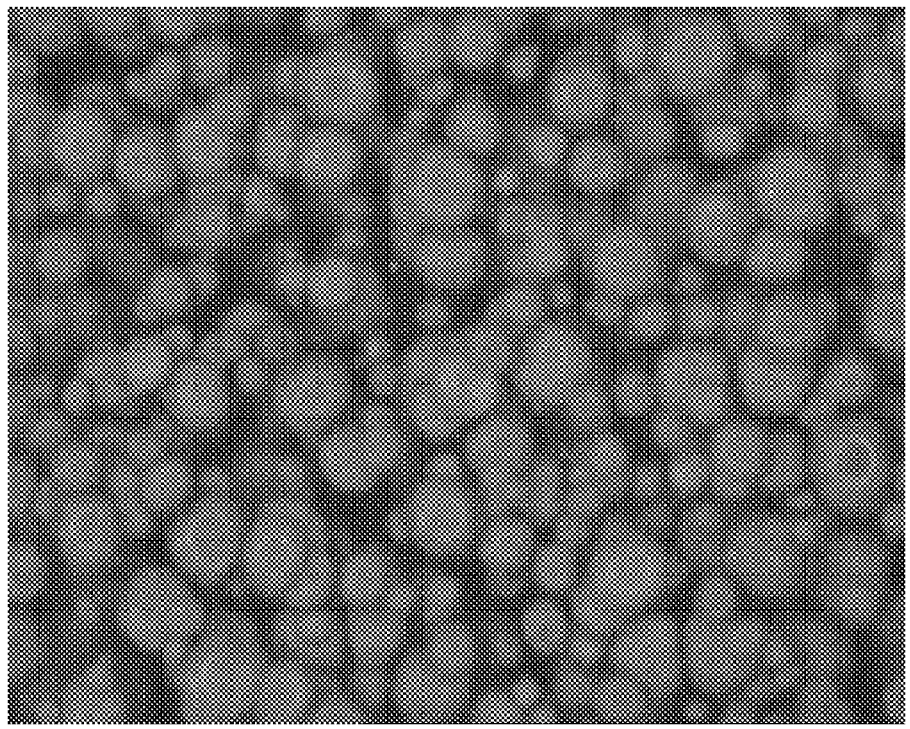
FIG. 1 is a photomicrograph of a layer of microcapsules and binder solution being used to prepare a water soluble binder electrophoretic medium of the present invention.

As already indicated, the present invention provides a number of improvements in capsules, materials for use therein, processes for their preparation, and electrophoretic media and displays using them. The various aspects of the invention will now be described sequentially, but it should be recognized that a single electrophoretic medium or display may make use of more than one aspect of the invention. For example, an electrophoretic display might use a polyanionic-based encapsulation material of the present invention in combination with a water soluble binder. The following discussion will conclude with a general discussion of various considerations regarding capsules for use in electrophoretic displays.

Polyanionic-based Encapsulation Material

As already mentioned, this invention provides an polyanionic-based encapsulation material comprising the coacervation product of a polyanionic polymer having a vinyl main chain and a plurality of anionic groups bonded to the main chain and a cationic or zwitterionic water-soluble polymer capable of forming an immiscible second phase on contact with the polyanionic polymer. The encapsulation material is preferably cross-linked with an aldehyde, for example glutaraldehyde. The polyanionic-based encapsulation materials of the present invention have been found to be less sensitive to changes in humidity than the prior art encapsulation materials formed from gelatin and acacia, as already described. When used in electrophoretic displays, the polyanionic-based encapsulation materials have surprising effects upon the electro-optic properties of the display; in particular, it has been found that the electro-optic properties of the display are less sensitive to humidity and moisture. Capsules prepared with preferred polyanionic-based encapsulation materials of the present invention have been found to tolerate temperatures up to about 100° C. without bursting.

The anionic groups in the polyanionic-based encapsulation materials of the present invention may be, for example, sulfate ($-OSO_3^-$), sulfonate ($-SO_3^-$), phosphate ($-OP(O)(OH)(O^-)$ or $-OP(O)(OH)(O^-)_2$), or carboxylic acid or carboxylate ($-COOH$ or $COO^-$) groups. The optimum proportion of anionic groups for any specific application may readily be determined empirically, but should be large enough that the polymer used to form the encapsulation material is water soluble, at least at high pH's of about 10 or higher, when all of the anionic groups are ionized. As is well known to those skilled in the part of polymer synthesis, the proportion of anionic groups in the polymer can readily be varied by varying the proportions of the monomers used to form the polymer.

In the preferred polymers of Formula I above, when one of the groups $R_1$ to $R_8$ is of the formula $-OR_9$, it may be a group derived from a vinyl ether or vinyl carboxylate ester, for example vinyl acetate. Similarly, when one of the groups $R_1$ to $R_8$ is of the formula $-COOR_{10}$, it may be a group derived from an acrylate or methacrylate ester. When one of the groups $R_1$ to $R_8$ is an aryl sulfonate, it may be a styrene sulfonic acid or styrene sodium sulfonate group. Finally, when one of the groups $R_1$ to $R_8$ is a halocarbon group, it may be a vinyl chloride or vinylidene chloride group.

Preferred polymers for use in the polyanionic-based encapsulation materials of the present invention include poly(acrylic acid); poly(methacrylic acid); copolymers of poly(acrylic acid) and/or poly(methacrylic acid) with esters of the same acids (i.e., poly(acrylic acid)-co-(butyl acrylate)); styrene sulfonate copolymers with styrene; methyl vinyl ether or vinyl acetate copolymers with (meth)acrylic acid; copolymers of alkyl-substituted olefins, methyl vinyl ether and vinyl carboxylate (e.g., vinyl acetate) with maleic acid, maleic esters, and maleic half ester, half acids. Examples of this last group of polymers include hydrolyzed poly(ethylene)-alt-(maleic anhydride), hydrolyzed poly(isobutylene)-alt-(maleic anhydride), hydrolyzed poly(methyl vinyl ether)-alt-(maleic anhydride), and other similar polymers. Solvolysis of the same maleic anhydride copolymers with simple alcohols gives half-ester, half-acid copolymers with widely varying hydrophobic-hydrophilic balance, which may be useful in the present invention. In all of these cases, the acid (anionic group) content of the polymer is sufficient to assure adequate water solubility, so that the coacervate phase can be made. However, the range of useful materials can be extended by the inclusion of a certain amount (between 0 and 50%) of a water-soluble co-solvent, such as methanol, tetrahydrofuran, dimethyl sulfoxide, dimethylformamide, acetone, or other water-miscible organic material, which both enhances the aqueous solubility of the coacervating anion, and which at the same time enhances the stability of the coacervate complex. Salts may be included in the microencapsulation medium to moderate coacervate formation.

As already mentioned, the second polymer used to form the polyanionic-based encapsulation material may be any cationic or zwitterionic water-soluble polymer capable of forming an immiscible second phase on contact with the polyanionic polymer. This second polymer may be, for example, a vinyl (addition) polymer comprising cationic functional groups, or a cationic condensation polymer, such as polyethylene imine, a cationic polyester, polyurethane, polyether or the like. However, the preferred second polymers for use in the present invention are cationic proteins, the specific preferred material being gelatin.

Apart from the use of a polyanionic-based encapsulation material, polyanionic-based electrophoretic media and displays of this invention can make use of any of the materials and production techniques described in the aforementioned MIT and E Ink applications, to which the reader is referred for additional details.

The following Examples are now given, though by way of illustration only, to show details of particular preferred materials and processes used in the polyanionic-based encapsulation materials, electrophoretic media and displays of the present invention.

EXAMPLE 1

Electrophoretic Display Using Poly(Acrylic Acid)/Gelatin Encapsulation Material

This Example illustrates the preparation of a polyanionic-based encapsulation material, electrophoretic medium and electrophoretic display of the present invention, the encapsulation material being formed by coacervation of poly(acrylic acid) and gelatin.

In a 4 L reactor equipped with a stirrer, gelatin (49.2 g) was dissolved in deionized water (2622.4 g) at 45° C. Separately, poly(acrylic acid) (molecular weight 250,000, 2.7 g of a 35 weight per cent solution in water, available from Sigma-Aldrich) was dissolved in deionized water (655.6 g) and the resultant solution heated to 45° C. Also separately, an internal phase (1060 g), comprising white and black pigment particles suspended in Isopar G (prepared substantially as described in the aforementioned application Ser. No. 10/063,236, Paragraphs [0069]–[0070]) was heated to 45° C. and then added, over a period of approximately 10 minutes, to the stirred gelatin solution. The addition was conducted by introducing the internal phase through a dropping funnel, the outlet of which was placed below the surface of the gelatin solution. After the addition of the internal phase was complete, the rate of stirring was increased to 580 rpm and the stirring continued for 60 minutes at 45° C. in order to emulsify the internal phase into droplets having an average diameter of about 40 μm.

The warm poly(acrylic acid) solution was then added over a period of about 1 minute. After the addition was complete, the pH of the mixture was raised to 6.3 using 1 per cent aqueous ammonium hydroxide, and the stirring was continued for a further 40 minutes. The temperature of the mixture was then lowered to 10° C. over a period of two hours, with continued stirring, and 16.7 g of a 50% solution of glutaraldehyde was added. After this addition, the mixture was gradually warmed to 25° C. and stirred for a further 12 hours.

The liquid phase was then removed and the capsules in this liquid phase washed by sedimentation and decantation, followed by redispersion in deionized water. The capsules were separated according to size by wet sieving to yield a distribution between 20 and 60 μm diameter, with a mean diameter of about 40 μm. Such a distribution can be achieved by sieving the capsules for 90 seconds on a 38 μm sieve and then for 90 seconds on a 25 μm sieve. The resulting capsule slurry was concentrated by centrifugation and decantation and then mixed with an aqueous urethane binder at a ratio of 1 part by weight binder to 8 parts by weight of wet capsules. This slurry was mixed with 0.3 weight per cent of hydroxypropylmethylcellulose (molecular weight 86,000), and 0.1 weight per cent Triton X-100 as slot-coating additives. The resultant mixture was slot-coated on to a 175 μm thick indium-tin oxide coated polyester film. The coated film was oven dried at 50° C. for 10 minutes to produce an electrophoretic medium comprising a coating of electrophoretic capsules approximately 20 μm thick, this coating comprising essentially a single layer of capsules (see the aforementioned WO 00/20922).

The resultant coated film was then assembled in the following manner into a polyanionic-based electrophoretic display of the present invention. A polyurethane adhesive (three different adhesives were used, as described in Example 3 below), was coated on a polyethylene terephthalate release sheet using a slot-die coater. The coated release sheet was transferred to an oven at 65° C. and dried for 10 minutes. During coating, the flow rate through the slot, and the coating-head speed were adjusted to provide a film of adhesive that measured 15 μm thick when dry. The coated and dried release sheet was then laminated to the microcapsule-coated polyester film using a Western Magnum roll laminator; the dried release sheet was laid on top of the microcapsule layer and laminated in the nip of the laminator at 50 psig (0.46 mPa), with the upper roll at 300° F. (149° C.) and the lower roll at 275° F. (135° C.), at a linear speed of 0.7 ft/min (3.5 mm/sec). The resulting laminate was then cooled, and a single-pixel display produced by cutting a piece of appropriate size from the cooled laminate, removing the release sheet, and laying the film, adhesive side down, on a rear electrode and passing the resultant combination through the laminator using the same conditions as before.

EXAMPLE 2

(Control): Electrophoretic Display Using Gum Acacia/Gelatin Encapsulation Material This Example illustrates the preparation of a prior art encapsulation material, electrophoretic medium and electrophoretic display of the type described above in which the encapsulation material is formed by coacervation of gum acacia and gelatin.

Encapsulation of the same internal phase as in Example 1 above was carried out in substantially the same manner as in that Example, except that gum acacia was used in place of poly(acrylic acid). After emulsification of the internal phase in gelatin, a solution of acacia (66.7 g, supplied by AEP Colloids, Inc.) in water (656 mL) was added over a period of about 1 minute, and the pH of the mixture was lowered to approximately 4.9 using 10 per cent aqueous acetic acid. A concentrated capsule slurry was prepared by washing and sedimentation as described in Example 1, and the pH of the slurry adjusted to pH 8 with 1 weight percent ammonium hydroxide solution. Capsules were concentrated by centrifugation and then mixed with an aqueous urethane binder at a ratio of 1 part by weight binder to 8 parts by weight of capsules. The coating of the capsules and the production of the electrophoretic medium and display were identical to those of Example 1.

EXAMPLE 3

Comparison of Electro-Optic Performance of Displays Under High Humidity

This Example illustrates the improved electro-optic performance of the electrophoretic display of the present invention prepared in Example 1 above under high humidity conditions, as compared with the prior art display prepared in Example 2 above.

The electro-optic performance of the displays prepared in Examples 1 and 2 above was evaluated after equilibration of the displays for two weeks in humidity-controlled chambers at 25° C./30% relative humidity (RH) and 25° C./70% RH. The displays were driven using 15 V switching pulses, and the reflectivity of the pixels to white light in the white and black states was measured. During these measurements, the length of the switching pulses was adjusted to achieve optical saturation of the displays; for the displays equilibrated at 30% RH, a pulse length of 300 msec was used, whereas for those equilibrated at 70% RH, pulse lengths up to 600 msec were employed, although optical saturation of the gelatin/acacia display was not always achieved even after this time, whereas the displays of the present invention achieved optical saturation using pulse lengths that showed little change between 30% and 70% RH. The contrast ratio (CR), defined as the ratio of the reflectivity in the white state to that in the dark state, was used as a measure of the electro-optic performance of the displays. The results are shown in the Table below.

As indicated in the Table, three different lamination adhesives were used. Adhesive 1 consisted of 60% by weight Neorez R9630 blended with 40% by weight Neorez R9330 (Neorez R9630 and Neorez R9330 are polyurethane latex suspensions supplied by Neoresins, Inc.). Adhesive 2 consisted of 50% by weight Neorez R9630 blended with 50% by weight Neorez R9330, while Adhesive 3 consisted of 40% by weight Neorez R9630 blended with 60% by weight Neorez R9330.

TABLE

| Example | Adhesive | CR 30% RH, 300 ms pulse | CR 70% RH, 300 ms pulse | CR 70% RH, 600 ms pulse |
| --- | --- | --- | --- | --- |
| 1 | 1 | 9.4 | 3.4 | 5.8 |
| 2 (Control) | 1 | 12.0 | 1.0 | 1.2 |
| 1 | 2 | 8.8 | 5.5 | 8.1 |
| 2 (Control) | 2 | 10.5 | 1.0 | 1.7 |
| 1 | 3 | 9.4 | 4.2 | 6.7 |
| 2 (Control) | 3 | 12.0 | 1.0 | 2.9 |

From the data in this Table, it will be seen that all the displays performed reasonably well at 30% RH, showing a contrast ratio of from 8.8 to 12.0 (which is sufficient to give clear rendition of text and other black and white information) and a rapid response time of 300 msec. When equilibrated at high (70%) RH, the Control displays showed essentially no switching, with contrast ratios of 1.0, whereas the displays of the present invention, using poly(acrylic acid) instead of gum acacia, still showed good switching, with contrast ratios greater than 3.4. The contrast ratios for the displays of the invention could be further improved by using a pulse length of 600 msec, whereas the Control displays still showed very poor electro-optic response at this increased pulse length. With an appropriate adhesive (Adhesive 2 in the Table), the response of the displays of the invention could be made almost as good at high RH as at low RH, if the slower switching time were accepted.

Water Soluble Binder Electrophoretic Media

As already mentioned, this invention provides an encapsulated electrophoretic medium in which the binder is a water-soluble (not simply water-dispersible) polymer, preferably a water soluble protein and desirably gelatin. In the MIT and E Ink patents and applications mentioned above, the binders shown in the working Examples are typically polyurethane latices. Although such latices are aqueous, the polyurethanes therein are not water-soluble and are present in the latex as a discrete solid phase, which usually requires a substantial amount of surfactant to form a stable latex. In contrast, the materials used in the water soluble binder aspect of the present invention are truly water soluble, so that the binder solution used in a true solution.

It has been found that using a water soluble binder rather than a latex to form the electrophoretic medium allows the production of thin electrophoretic media, and thus (for reasons previously discussed) lower operating voltages, or alternatively faster switching times at the same operating voltages. The low glass transition temperatures ($T_g$'s) of water soluble binders, especially proteins, allow the polymeric binder material to rearrange and thus shrink while water is evaporating from the binder/microcapsule layer during the drying step. The enhanced shrinkage of the polymeric binder thus produced results in the final thickness of the binder/microcapsule layer being a smaller proportion of the initial thickness of the layer of microcapsules and binder solution than when a polymer latex is used as the binder solution, since when a polymer latex is dried, the water between the polymer particles is driven off and the particles coalesce, but the polymer particles themselves, which typically have a $T_g$ greater than those of water soluble binders, are unable to shrink appreciably as the layer dries.

Figure 2:
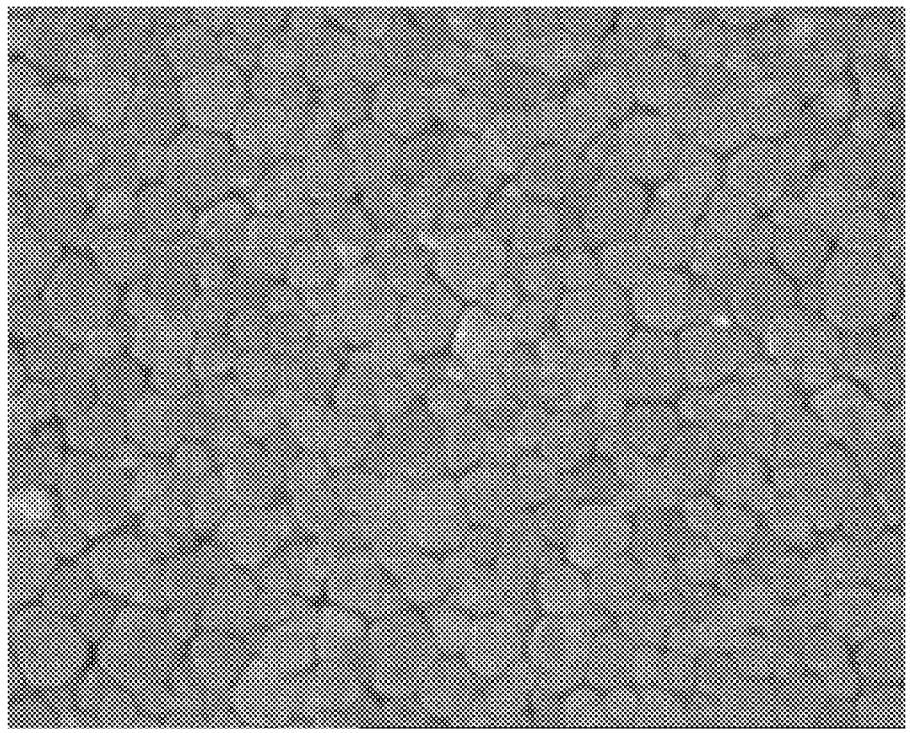
FIG. 2 is a photomicrograph, similar to that of FIG. 1, showing the final electrophoretic medium prepared from the microcapsules and binder of FIG. 1.
Figure 3:
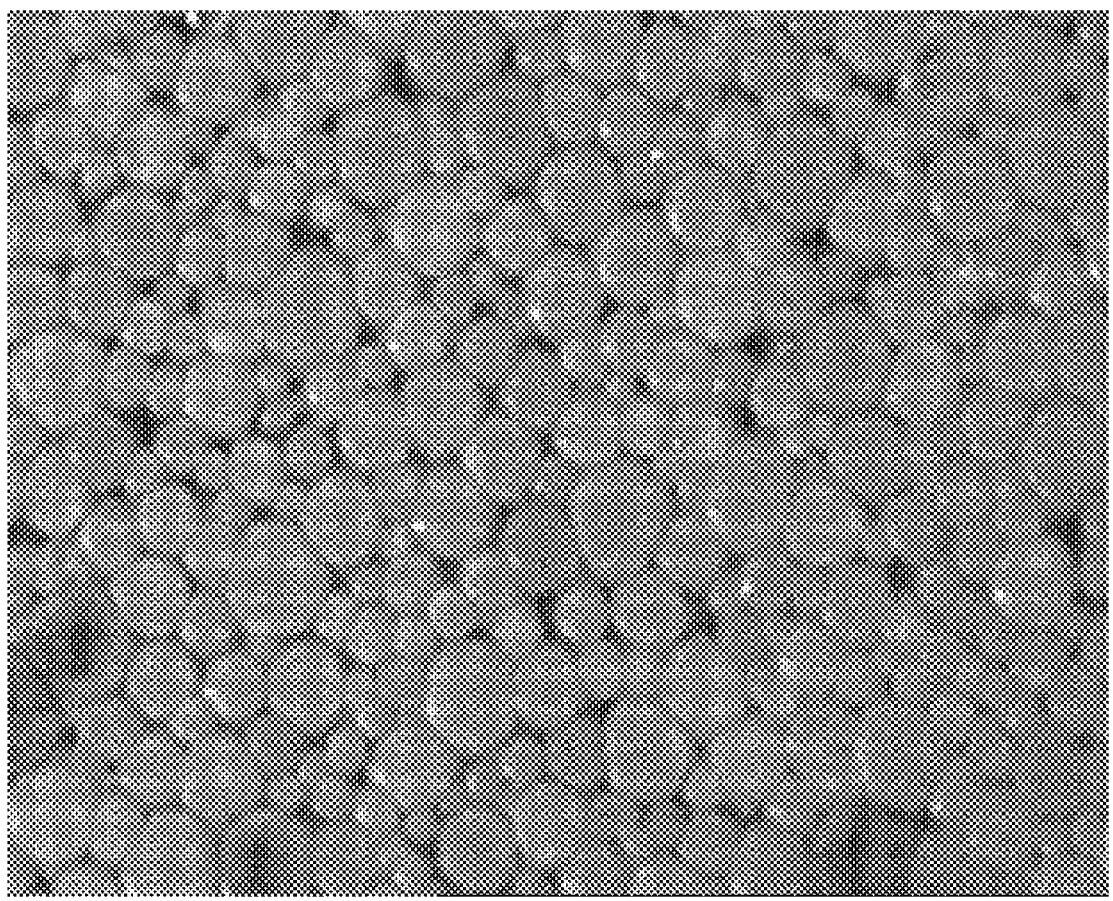
FIG. 3 is a photomicrograph, similar to that of FIG. 2, but showing a control medium which does not use contain a water soluble binder.

This difference between the behavior of electrophoretic media made with water-dispersed and water soluble binders can be observed microscopically. FIG. 1 of the accompanying drawings is a photomicrograph of a layer of microcapsules (average diameter about 35 μm) and binder solution as initially deposited; FIG. 1 shows a layer used to form a water soluble binder electrophoretic medium of the present invention, but, at this stage of the process, there is little difference between media formed with the two types of binders. As the layer is dried and water is evaporated therefrom, a large amount of shrinkage of the microcapsule/binder mixture occurs, resulting in a high degree of deformation of the capsules, which are compressed into an essentially close packed dried film, of decreased film thickness, as shown in FIG. 2. (For discussion of the role of shrinkage of the microcapsule/binder solution mixture, and consequent changes in the shape of the microcapsules, see the aforementioned U.S. Pat. Nos. 6,067,185 and 6,392,785.) In contrast, as shown in FIG. 3, a similar medium prepared with a water dispersed latex shows substantially less deformation of the capsules, and a less close packed structure. The close packed structure produced in the medium of the present invention is advantageous because this structure improves the "active fraction" of the display, i.e., the proportion of the physical area of the display which is covered by the microcapsules, and which thus changes optical state when an electric field is applied across the medium. It is desirable that this active fraction be as large as possible, since the gaps between the microcapsules visible in FIG. 3, which do not change optical state when the medium is switched, reduce the contrast ratio of a display incorporating the electrophoretic medium.

The following Example is given by way of illustration only to show a preferred water soluble binder electrophoretic medium.

EXAMPLE 4

A slurry of microcapsules were prepared substantially as described in the aforementioned application Ser. No. 10/063, 236, Paragraphs [0061]–[0068]. An aliquot (25 g) of the slurry, containing 80 per cent by weight of microcapsules, was mixed with an aqueous gelatin solution (9 g of a 15 weight percent solution, equivalent to 1.33 g of gelatin) so that the weight ratio of capsules to gelatin in the mixture was 15:1. Mixing was effected at 45° C. and the resultant mixture was maintained at this temperature and stirred until completely homogeneous. The mixture was then coated on a polyester film using a draw bar at 2, 3 and 4 mil (51, 76 and 101 μm respectively) settings. FIG. 1 illustrates the appearance of the wet 2 mil film at this point. The coated films were allowed to dry in air for 10 minutes and then in an oven at 50° C. for 15 minutes, after which the film produced at the 2 mil setting produced a dried film 25 μm thick, substantially the thickness desired; the dried film is shown in FIG. 2. To provide a control Example, the experiment was repeated replacing the gelatin solution with an aqueous polyurethane latex (NeoRez R 9320, available form NeoResins, Inc., Wilmington Mass.). FIG. 3 shows the dried polyurethane film corresponding to FIG. 2, and as previously mentioned this film shows much less satisfactory packing and coverage than that in FIG. 2.

Swellable Wall Capsules

As already mentioned, this aspect of the present invention provides a capsule comprising a capsule wall and an internal phase encapsulated by the capsule wall, the internal phase comprising a suspending fluid and a plurality of electrically charged particles; the capsule wall is formed of a material which is swellable by the suspending fluid.

Hitherto, capsules used for electrophoretic displays have had capsule walls of a material that is not soluble in, and non-swellable by, the suspending fluid within the capsule. The capsule walls thus spatially contain (encapsulate) the suspending fluid. A non-swellable capsule wall material usually results in a mismatch of electrical properties between the wall and the suspending fluid, and this mismatch can give rise to self-erasing under some conditions.

In contrast, in the swellable wall capsule of the present invention, the capsule wall is formed from a material which is swellable by the suspending fluid. Only slight swelling of the capsule wall is needed to produce the advantages of the present invention, and excessive swelling should be avoided since it may weaken the mechanical strength of the wall and consequently limit the mechanical integrity of the electrophoretic medium. Using a swellable wall material in accordance with this invention causes the capsule walls to become slightly swollen by the suspending fluid, thus making the volume resistivity of the capsule walls similar to that of the volume resistivity of the suspending fluid, and reducing the mismatch in electrical properties which appears to be the cause of self-erasing.

Typically, the suspending fluid used in an electrophoretic medium is a hydrocarbon, typically an aliphatic hydrocarbon, alone or in admixture with a halocarbon. Wall materials which can be slightly swelled by such a hydrocarbon include silicones (for example poly(dimethyl siloxane) and poly (trifluorobutyl methyl siloxane)), polymers derived from vinylic monomers (for example poly(vinyl chloride), poly (butadiene), polyacrylates and polymethacrylates) and polyurethanes.

Although the wall material used is swellable by the suspending fluid, the binder which typically surrounds the capsules and the lamination adhesive typically provided adjacent this binder should not be so swellable. It is desirable that the suspending fluid be essentially confined to the spaces occupied by the capsules and not migrate to other parts of the electrophoretic medium or display, since migrating internal fluid may cause serious problems, such as partial or complete delamination of various layers of the display, unwanted color changes or chemical or electrochemical reactions (for example at the electrodes) which may adversely affect the operating performance and/or lifetime of the display. Using a binder and lamination adhesive which are not swellable by the suspending fluid ensures that, even though some suspending fluid migrates into the capsule wall as that wall swells, this suspending fluid cannot migrate further to cause the aforementioned problems.

The swellable wall capsules may be prepared by any of the various methods known in the art. For example, the capsules may be prepared by coacervation of the wall material around preformed droplets of the internal phase, or by the various extrusion techniques described in the aforementioned U.S. Pat. No. 6,377,387. It should be noted that, although the swellable wall material will have substantial affinity for the suspending fluid (otherwise it would not be swellable by the fluid), the presence of significant amounts of wall material, or of components used to produce the wall material, in the suspending fluid within the final capsule should be avoided, since such material may adversely affect the electro-optic performance of the electrophoretic medium. The process used to produce the capsules should be chosen with this in mind. More specifically, any monomers, oligomers or polymers which are produced during formation of the capsule walls should be essentially insoluble in the suspending fluid, or, if they are soluble, an encapsulation method should be chosen which allows for rapid reaction of the material to form the capsule wall once the material comes into contact with the suspending fluid, thus ensuring that no more than a minimal amount of the material remains in the suspending fluid. Appropriate methods include coextrusion of the internal phase with a solution of the wall material under conditions which ensure rapid evaporation of the solvent from the wall material solution, or radiation-initiated polymerization of the wall material, preferably with ultra-violet radiation.

The presently preferred method for preparing capsules with swellable walls is concentric nozzle coextrusion, as described in detail in the aforementioned U.S. Pat. No. 6,377,387, with extrusion of the internal phase through the inner nozzle, and extrusion of a fluorosilicone (for example, Dow Fluorgel 3-6679, available from Dow Chemical Company, Wilmington Del.) through the outer nozzle, followed by curing of the resultant capsule walls at elevated temperature. Alternatively, the silicone could be replaced by an ultra-violet curable epoxy resin (several suitable resins are available from DSM desothech) followed by ultra-violet irradiation of the coextruded internal phase/epoxy droplets.

The internal surface of the capsule wall may be provided with polymer chains which are solvated by the suspending fluid. The aforementioned 2002/0185378 describes the advantages of providing polymer chains on the surfaces of the electrophoretic particles themselves, and notes that such polymer chains are desirably chosen so that they are highly solvated by the suspending fluid so that they spread into a so-called "brush structure" which sterically stabilizes the particle in suspension in the suspending fluid. The presence of such polymer chains on the surfaces of the electrophoretic particles also helps to avoid the particles sticking to the capsule wall, since the solvated polymer layer reduces the attractive force between the particle and the wall. However, additional protection against particles sticking to the capsule can be provided by providing solvated polymer chains on the wall also, thus providing two sets of polymer chains between the particle and the wall and further reducing the attractive force therebetween.

Since, as already mentioned, the suspending fluid used in an encapsulated electrophoretic medium is typically an aliphatic hydrocarbon, the polymer chains provided on the capsule wall should normally be chosen to be highly solvated by such a hydrocarbon. Extensive guidance regarding preferred types of polymer chains is given in the aforementioned 2002/0185378, and the same considerations apply to polymer chains provided on the capsule wall. In general, it is preferred that the polymer chains have a main chain and a plurality of side chains extending from the main chain, each of the side chains comprising at least about four carbon atoms, thus providing a highly branched structure. Such a chain can be produced by polymerization of a monomer having a polymerizable group and a long alkyl chain, for example lauryl methacrylate.

Those skilled in the art of polymer synthesis will be familiar with numerous methods which could be used to provide the polymer chains on the capsule walls. In general, it is preferred to provide the polymer chains before the material is formed into the capsule wall, but we do not exclude the possibility of forming such polymer chains by reaction between a reactive site provided on the capsule wall and a reagent provided in the suspending fluid itself.

As already indicated, the swellable wall capsule aspect of the present invention provides capsules which are less susceptible to self-erasing than prior art capsules. In addition, the swellable wall capsule aspect of the present invention provides capsules in which the particles show reduced tendency to stick to the capsule wall.

Mixed Binder/Adhesive Electrophoretic Medium

As already indicated, the mixed binder/adhesive aspect of the present invention provides an electrophoretic medium in which at least one of the polymeric binder and (optional) lamination adhesive is formed from a blend of two (or more) materials, preferably polymers, the blend having lower changes in volume resistivity with humidity than either component separately.

The preferred materials for use in such a mixed binder/adhesive electrophoretic medium are polyurethanes, especially polyurethanes produced from aliphatic polyesters. Such polyurethanes are available commercially in the form of anionic aqueous dispersions, for example as NeoRez R 9621, R 9314 and R 9630, all from NeoResins, Inc.

It may at first glance appear surprising that a mixture of two or more materials which themselves have volume resistivities which vary substantially with relative humidity of the environment, can have a volume resistivity which varies much less with relative humidity. However, this apparent anomaly is explicable in terms of the chemistry of polyurethanes and other polymers used as binders and lamination adhesives (although the present invention is in no way limited by the following explanation of the anomaly). Polyurethanes and other water-borne polymers of contain certain chemical segments, such as carboxylic acid groups, and urethane and urea groupings, which are susceptible to moisture uptake. When two or more of such materials are mixed, some of these chemical segments may react with each other and cross-link the materials; cross-linking is a common method of improving the resistance of a single polymer to moisture.

The following Examples are now given, though by way of illustration only, to show preferred blends which may be useful in mixed binder/lamination adhesive electrophoretic media of the present invention.

EXAMPLE 5

This Example illustrates one specific blend of polyurethanes the volume resistivity of which changes much less with relative humidity than does that of either component separately.

The polyurethanes used in this Example were NeoRez R 9314 and NeoRez 9621, and a 3:1 w/w blend of the two polyurethanes. Films of all three materials were coated on to an indium-tin oxide (ITO) coated polyester film, dried, and a second ITO-coated polyester film laminated to the first so as to sandwich the polyurethane layer between the two ITO-layers. The resultant samples were placed in controlled humidity environments of from 20 to 90 percent relative humidity (RH) at room temperature (approximately 20° C.) and their volume resistivities measured at intervals, by impedance spectroscopy and current transient measurements, until they became stable, thus showing that the samples were in equilibrium with the controlled-humidity air surrounding them. All resistivity ratios reported are based on the resultant equilibrium values.

Figure 4:
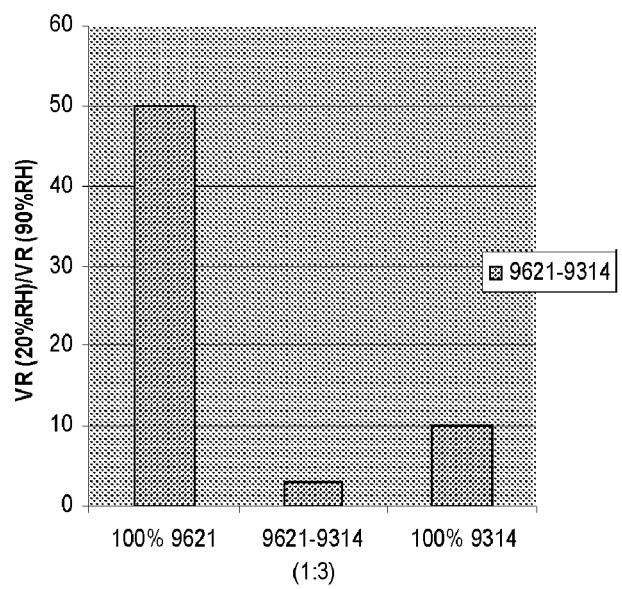
FIGS. 4 and 5 are graphs showing the variations of volume resistivity with relative humidity for certain polyurethanes and blends thereof, as determined in Examples 5 and 6 below.

The results obtained are shown in FIG. 4 of the accompanying drawings, where the results are plotted as the volume resistivity at 20 per cent RH divided by that at 90 per cent RH. From this Figure, it will be seen that the blend of R 9314 and R 9621 had a volume resistivity which was much less sensitive to humidity that that of either component alone, the volume resistivity of the blend varying by only a factor of about 3 between 20 and 90 per cent RH, whereas the components varied by factors of about 10 (R 9314) and 50 (R 9621) respectively.

EXAMPLE 6

This Example illustrates a second specific blend of polyurethanes the volume resistivity of which changes much less with relative humidity than does that of either component separately.

Figure 5:
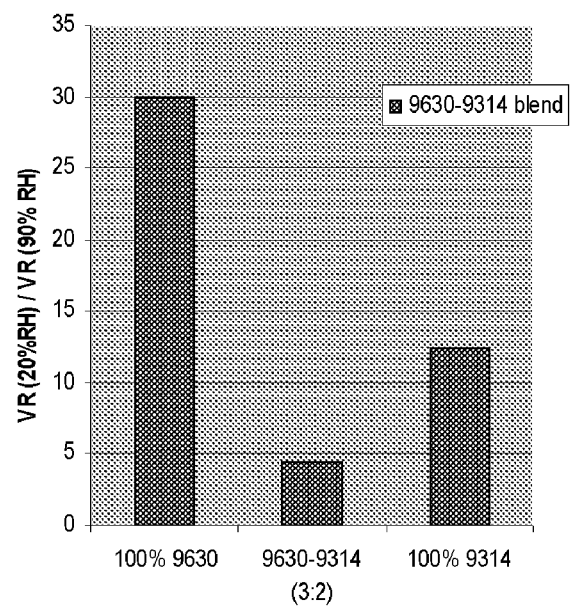

Example 5 was repeated except that the materials tested were NeoRez R 9314, NeoRez R 9630, and a 3:2 w/w blend of the two polyurethanes. The results obtained are shown in FIG. 5 of the accompanying drawings. From this Figure, it will be seen that the blend of R 9314 and R 9630 had a volume resistivity which was much less sensitive to humidity that that of either component alone, the volume resistivity of the blend varying by only a factor of about 4.5 between 20 and 90 per cent RH, whereas the components varied by factors of about 13 (R 9314) and 30 (R 9630) respectively.

From the foregoing, it will be seen that the mixed binder/adhesive aspect of the present invention provides electrophoretic media which are much less sensitive to relative humidity than prior art media relying upon simple polyurethane binders and lamination adhesives. Thus, the electrophoretic media of the present invention can operate over an increased range of relative humidity.

Apart from the modification of the capsules walls in accordance with the present invention, the mixed binder/adhesive electrophoretic media and displays of this invention can make use of any of the materials and production techniques described in the aforementioned MIT and E Ink applications, to which the reader is referred for additional details.

Two Prepolymer Process

As already indicated, capsules produced by the complex coacervation of gelatin and acacia, as described in some of the aforementioned E Ink and MIT patents and published applications, have been found to be sensitive to the relative humidity of the environment. Consequently, displays based upon such capsules may operate only within a limited relative humidity range, or relatively complex sealing and/or barrier arrangements may be needed to enable operation over a wider relative humidity range. The two prepolymer process of the present invention seeks to provide capsules which are less humidity sensitive than capsules produced by the complex coacervation of gelatin and acacia.

In general terms, the two prepolymer process involves dissolving or dispersing a first prepolymer having first reactive groups in a fluid, for example, the suspending fluid to be used in an electrophoretic medium; obviously, this fluid may contain additional components, for example one or more types of electrically charged or chargeable particles which will eventually serve as the electrophoretic particles of the medium. Separately, a second prepolymer having second reactive groups is dissolved or dispersed in a dispersion medium, which is substantially immiscible with the fluid containing the first prepolymer, and is typically aqueous. The prepolymers are chosen so that the first and second reactive groups will react together so as to join the prepolymers into a polymer which forms a suitable capsule wall material. The fluid containing the first prepolymer is dispersed as a plurality of droplets in the dispersion medium, so that at the interface between the two phases the reaction between the two prepolymers forms a polymer, typically formed by cross-linking of the two prepolymers, and this polymer forms a capsule wall within which the fluid is encapsulated.

It will be appreciated that the prepolymers should be chosen so that either there is no substantial amount of first prepolymer left within the capsules after the encapsulation is complete, or the amount of first prepolymer so left does not adversely affect the expected properties of the capsule. For example, when the two prepolymer process is used to form an encapsulated electrophoretic medium, any first prepolymer left within the final capsules should not interfere with the electrical charging of the electrophoretic particles essential for the proper operation of the medium.

In one experimental demonstration, the two prepolymer process was used to prepare electrophoretic capsules having an internal phase comprising titania and carbon black particles dispersed in a hydrocarbon suspending fluid. The prepolymers used were two commercial prepolymers, namely poly(isoprene-graft-maleic anhydride) (Pl-g-MA) (hydrocarbon soluble) and polyethyleneimine (PEI) (water soluble). Polymer formation between these two prepolymer occurs by reaction of the amine groups on the PEI with the anhydride groupings on the Pl-g-MA to form amide linkages, which cause the polymer not to be soluble in either hydrocarbon or water. A typical encapsulation procedure is as follows.

An electrophoretic medium internal phase (hydrocarbon containing titania and carbon black particles) was emulsified in water in the presence of non-ionic surfactant for one hour with mechanical agitation to form a hydrocarbon-in-water emulsion. To this emulsion, there was added dropwise an aqueous solution of PEI, with continued mechanical agitation. The reaction was allowed to proceed for 15 minutes after the addition of the PEI had been completed and the resultant capsules were separated from the liquid by centrifugation. A portion of the capsules were coated on to a glass slide and dried.

Figure 6:
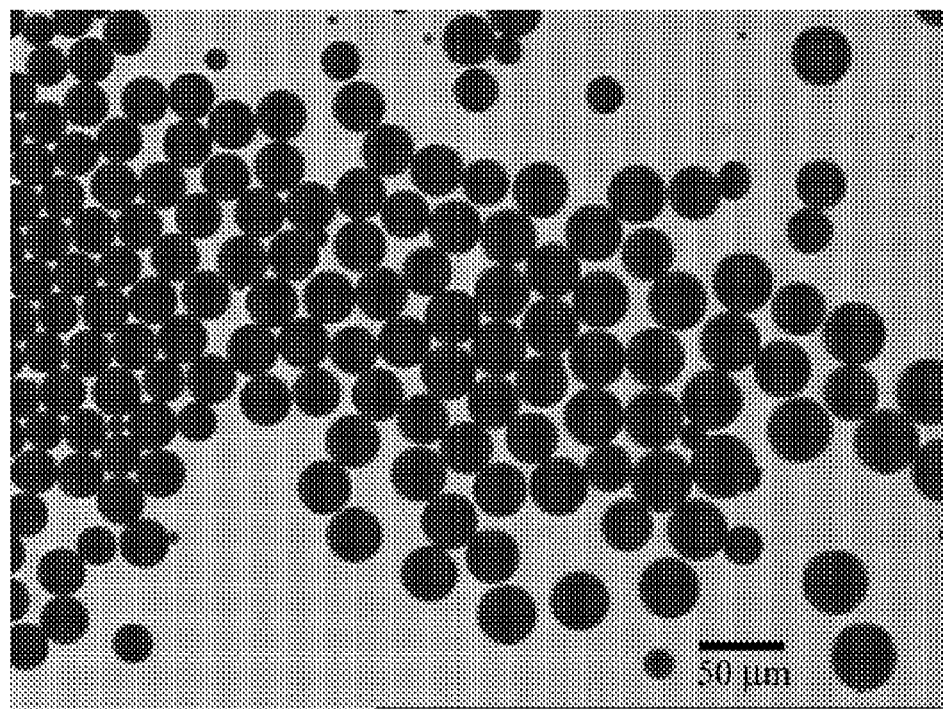
FIGS. 6 and 7 are photomicrographs of capsules produced by a two prepolymer process of the present invention, FIG. 6 showing the capsules dispersed in water and FIG. 7 showing the capsules in the form of a dried film.
Figure 7:
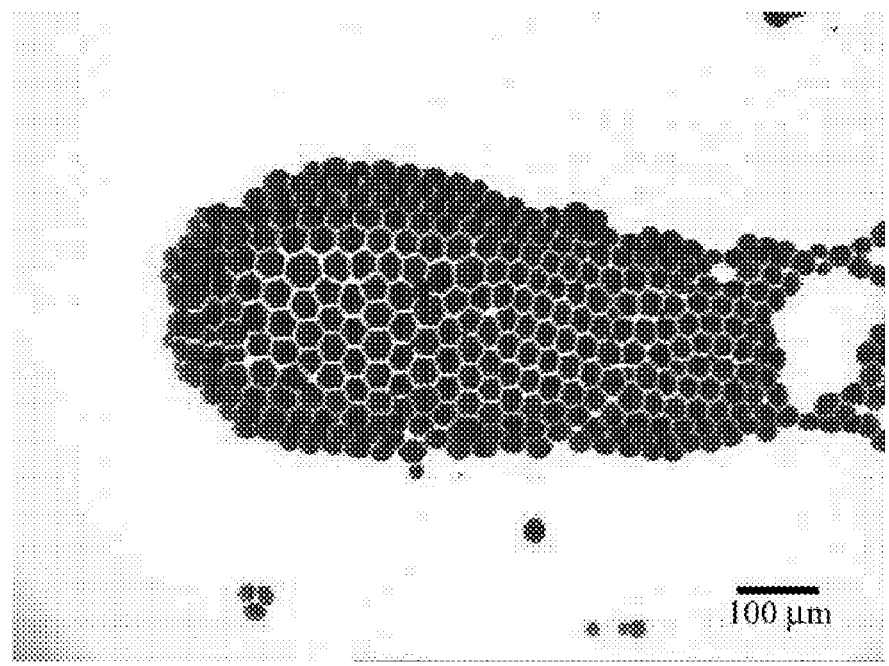

FIG. 6 of the accompanying drawings is an optical photomicrograph of the capsules formed in reaction is suspension in the liquid. It will be seen from this Figure that the particles do not coalesce even in close contact, a strong indication that a substantial capsule wall has been formed surrounding the internal phase. FIG. 7 is a similar optical photomicrograph of the dried film and illustrates the close packing of the capsules, suggesting they are highly deformable.

The two prepolymer process of the present invention has the advantages that it can be carried out at ambient temperature, thus avoiding the heating and cooling of the reaction mixture required in other encapsulation processes, the consequent reduction in processing time. Furthermore, the properties of the capsule wall formed by easily be adjusted by varying the prepolymers and the reaction conditions. The process can also produce capsules with substantially reduced humidity sensitivity.

General Considerations Concerning Capsules

It appears (although this invention is in no way limited by any theory as to such matters) that this service life of electrophoretic displays is limited by factors such as sticking of the electrophoretic particles to the capsule wall, and the tendency of particles to aggregate into clusters which prevent the particles completing the movements necessary for switching of the display between its optical states. In this regard, opposite charge dual particle electrophoretic displays pose a particularly difficult problem, since inherently oppositely charged particles in close proximity to one another will be electrostatically attracted to each other and will display a strong tendency to form stable aggregates.

Substantial improvements in the overall performance of electrophoretic displays may be expected from alternative encapsulation materials and processes. As previously described, in the most well developed encapsulated electrophoretic displays, capsules may be constructed containing a pigmented dielectric fluid as an internal phase surrounded by a thin shell of a tough, impermeable polymeric material. The dimensions of the encapsulated particles are typically on the order of 50 to a few hundred microns in size; the shell thickness is 10 nm or less. For application in electrophoretic displays, the capsule must satisfy a long list of requirements to guarantee satisfactory performance. Among these requirements are the following:

1. The encapsulation procedure must be reproducible and manufacturable, involve inexpensive raw materials, and yield capsules that are totally impermeable to the contents.

2. The capsules must be amenable to coating. While the properties of the encapsulated dispersion that allow facile, uniform coating are not entirely understood, one property that is important is flexibility of the capsule wall. If the wall is too rigid, the coating suspension shows severe shear-thickening rheological behavior, and is either impossible to coat because of hopper jamming or yields very non-uniform coatings. Flexibility of the capsule wall also allows closer packing in the coating, and thus yields displays with improved optical properties.

3. The capsule wall must have mechanical, optical, and electrical properties that allow the construction of a durable display with rapid response at low driving voltages. In particular, the shell must be tolerant to mechanical deformation (this is especially important for flexible display applications) and must not be appreciably colored or opaque. Also, the electrical resistance of the shell wall material must be high; a capsule wall with poor electrical properties can short out the display.

4. The capsule wall must maintain its properties over a wide range of operating conditions. As already discussed, the response of the capsule to changes in humidity is especially problematical, since it has been found to be difficult to achieve simultaneously all of the characteristics listed above with a capsule wall composition whose electrical conductivity is sufficiently insensitive to high ambient humidity. Improvements in the environmental sensitivity of the capsule wall represent a major contribution to the robustness of the display.

For the foregoing reasons, encapsulation technology is seen as the largest single barrier to achieving a rugged, truly environmentally insensitive electrophoretic display.

The following approaches may be used to improve the durability and robustness of electrophoretic displays:

1. Synthetic manipulation of the coacervate polymers to reduce their humidity sensitivity, particularly by the incorporation of hydrophobic moieties into one or both of them; alternatively, complete replacement of one or more of the natural polymers with specially designed synthetic polymers, with carefully balanced charge and hydrophobic character;

2. Other encapsulation methods, specifically modifications thereof that provide improved performance in electrophoretic display function and manufacture; and 3. Replacement of organic capsule wall material with inorganic materials such as silica or organic/inorganic composites or hybrid materials, using technology for surface modification (see the aforementioned 2002/0185378), or modifications of other procedures disclosed in the literature.

Polymeric Materials for Coacervate Encapsulation

Gelatin can form a complex coacervate phase with a wide variety of polyanions. The structure of the polyanion can have a substantial effect on the electrical properties of the wall material, and on the environmental sensitivity of the resulting display. This approach provides a simple solution to the environmental sensitivity issue and imposes the least disruption on existing display manufacturing processes.

Chemical intuition suggests that replacement of gum acacia with a less hydrophilic synthetic polymer would reduce the affinity of the coacervate shell to water. To this end, this invention relates to the use of polyanions with moderately hydrophobic backbone substitution. As already discussed above with regard to the polyanionic-based encapsulation materials of the present invention, one particularly attractive class of polyanionic materials are the polycarboxylic acid polymers prepared from alt-poly(olefin-maleic anhydride). These materials are commercially available with a range of hydrophobic side chains, depending on the choice of olefin co-monomer. Another class of readily available materials suitable for the intended application comprise co-(meth)acrylate ester-(meth)acrylic acid copolymers. Sulfonate polymers based on copolymers of styrene or acrylate esters with styrene sulfonic acid are also attractive alternatives.

This invention extends to modification of the anionic component of the coacervate, and modification of gelatin. The simplest modification involves acylation of lysine ammonium side groups to yield (neutral) amide functions. Since this reaction destroys the cationic groups that allow coacervation with polyanions to occur, only partial modification by this route is possible. Alternatively, esterification or amidation reactions with carboxyl function on the gelatin are possible.

Other Encapsulation Techniques

Complex coacervation techniques as described above yield capsule walls that inevitably comprise, at least in part, polar functionality, i.e., the ion pairs that cause complex formation. The ability to control the electrical resistance of capsule walls formed by this process is therefore inherently limited. Encapsulation materials formed by in situ or interfacial polymerization processes do not necessarily involve highly polar components, and, further can be made with high cross-link densities by incorporation of multifunctional monomers. This invention therefore extends to the use of several of these processes for the construction of capsules for electrophoretic display applications.

Two limitations on the utility of these capsules are apparent. First, if the capsule wall is too hydrophobic, it become permeable to the encapsulated dielectric fluid in the internal phase. This problem can in part be overcome by higher cross-linking densities, and by the use of wall-forming monomers with limited solubility for hydrocarbons. However, high cross-linking density tends to yield rigid, non-deformable capsules, and as we have previously mentioned, these materials are not only difficult to coat, but also yield displays with poor capsule packing and degraded electro-optical properties. An optimized capsule reflect a proper balance of polarity of the wall materials and their mechanical properties.

Reliable methods for encapsulation by in situ and interfacial polymerization are well-known in the literature; see, for example, the aforementioned U.S. Pat. No. 6,377,387. Among the attractive alternatives are formation of capsules by amide-formaldehyde copolymerization and the use of amine plus acid chloride and amine plus isocyanate reactions. The first of these methods (urea-formaldehyde or melamine-formaldehyde) has been shown to yield highly rigid capsules that are not easily compatible with the remainder of a typical encapsulated electrophoretic display manufacturing process. However, this process can be modified to provide less rigid shells by using blocked urea derivatives (e.g., N,N"-dimethylurea) or simple primary or secondary amides as co-reactants to reduce the degree of cross-linking. Because of the toxicity of formaldehyde, blocked formaldehyde precursors (hexamethylene tetramine, formaldehyde sulfonate adduct, etc.) may be used as synthetic alternatives. It should be noted that urea-formaldehyde polymerization has also been shown to reinforce gelatin/acacia and other coacervate capsules, providing an improved encapsulation procedure. Such a hybrid capsule wall should show improved RH sensitivity in a electrophoretic display device. Other more exotic hybrid structures are considered below.

Because the binders and adhesives presently used in encapsulated electrophoretic displays are typically polyurethane-based, encapsulation using polyisocyanate precursors has advantages with regard to melt and coating compatibility. The procedure of Schur, et al. (U.S. Pat. No. 4,285,720), yielding a poly(substituted urea) shell by self-hydrolysis of the isocyanate is attractive because of its simplicity. The properties of the shell can in principle be modified by incorporation of di- or polyfunctional amines in the aqueous phase during encapsulation. By appropriate choice of the structure of the amine(s) and its concentration, a wide variety of shell properties are obtainable.

A third chemistry for interfacial polymerization includes the combination of hydrophobic poly(acyl halide) derivatives in the oil phase combined with polyamino compounds in the aqueous phase to yield polyamide shells. This chemistry, also well documented in the literature as an encapsulation technique, further expands the range of chemical constitutions available for microencapsulated electrophoretic display devices. Which chemistry is most advantageous is any specific application is determined by a combination of studies of synthetic facility and device function, particularly in the context of environmental sensitivity.

Organic/Inorganic Hybrid Capsules

The ultimate in shell impermeability and low resistivity is obtained using a capsule walls based on inorganic polymeric materials. As an example, a condensed silica shell can be made completely impermeable to both water and hydrophobic materials, and also have very low conductivity. Such a shell would also, however, be expected to be very rigid, with attendant manufacturing difficulties. Encapsulation using inorganic/organic hybrid structures allows the permeability and electrical properties to improve relative to the organic materials, while a degree of flexibility is provided by the organic component. A number of routes to such hybrid structures can be used. Surface-modified silica particles with incorporated amine functionality may be incorporated with either polyisocyanate or poly(acyl halide) interfacial polymerization procedure as described above. Alternatively, polycarboxylate polymers bind strongly to many inorganic colloidal materials (e.g., alumina). Appropriate choice of polycarboxylate concentration and structure can lead to a surface-active aggregate structure that will adsorb strongly at the oil-water interface (such aggregates are known to be involved in the formation of so-called Pickering emulsions, oil-in-water emulsions stabilized by inorganic colloids). Once formed, the interfacial structure can be reinforced and thickened by successive deposition of further layers of alumina and polymer, either sequentially or in a single step. Most simply, colloidal materials with anionic surfaces, notably silica at pH values near neutrality, can be regarded as polyanionic materials that are capable of forming coacervate phases with gelatin or other polymers with cationic substituent groups just as gum acacia or polycarboxylates do. The observation by Wang and Harrison (G. Wang and A. Harrison, J. Colloid Interface Sci., 1999, 277, 203) that an adsorbed gelatin layer acts as a priming agent for the encapsulation of iron particles by silica using the Stöber process supports this view.

Such novel hybrid coacervate encapsulation media show interesting properties in microencapsulated electrophoretic display devices. At least part of the RH sensitivity of conventional coacervate microcapsule walls is the result of the swellability of the anionic component. To the extent that the water affinity of this component is reduced or eliminated, water uptake at high RH, with its attendant reduction in resistance and increased permeability, is reduced.

While the invention has been particularly shown and described with reference to specific preferred embodiments, it should be understood by those skilled in the art that various changes in form and detail may be made therein without departing from the spirit and scope of the invention. Accordingly, the foregoing description is to be construed in an illustrative and not in a limitative sense.

What is claimed is:

1. A process for encapsulating a internal phase, which process comprises contacting the internal phase with a polyanionic polymer having a vinyl main chain and a plurality of anionic groups bonded to the main chain and with a cationic or zwitterionic water-soluble polymer capable of forming an immiscible second phase on contact with the polyanionic polymer, the contact being effected under conditions effective to cause formation around the internal phase of a capsule wall comprising a coacervation product of the two polymers.

2. A process according to claim 1 wherein the capsule wall formed is thereafter contacted with an aldehyde.

3. A process according to claim 2 wherein the aldehyde comprises glutaraldehyde.

4. A process according to claim 1 wherein the protein comprises gelatin.

5. A process according to claim 1 wherein the anionic groups are any one or more of sulfate, sulfonate, phosphate, carboxylic acid and carboxylate groups.

6. A process according to claim 1 wherein the polyanionic polymer is of the formula:

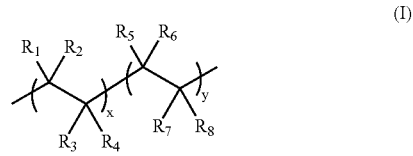

(I)

where x and y are the mole fractions of the two monomer residues in the polymer and total 1, one or more of $R_1$ to $R_8$ is an anionic group, and those of $R_1$ to $R_8$ which are not anionic groups are hydrogen, saturated hydrocarbon groups, groups of the formula —$OR_9$ or —$COOR_{10}$ (wherein $R_9$ and $R_{10}$ are hydrocarbon groups), aryl, substituted aryl or halocarbon groups.

7. A process according to claim 1 wherein the polyanionic polymer comprises any one or more of poly(acrylic acid); poly(methacrylic acid); copolymers of poly(acrylic acid) and/or poly(methacrylic acid) with esters of the same acids;

styrene sulfonate copolymers with styrene; methyl vinyl ether or vinyl acetate copolymers with (meth)acrylic acid; copolymers of alkyl-substituted olefins, methyl vinyl ether and vinyl carboxylate with maleic acid, maleic esters, and maleic half ester, half acids.

8. A process for forming a capsule, the process comprising:
provided a liquid internal phase comprising a fluid and a first prepolymer dispersed therein and having a plurality of first reactive groups;
providing a dispersion medium substantially immiscible with the internal phase and comprising a dispersing liquid and a second prepolymer dispersed therein and having a plurality of second reactive groups, each of the second reactive groups being capable of reacting with at least one of the first reactive groups; and
dispersing the internal phase as a plurality of discrete droplets in the dispersion medium, thereby causing the first and second reactive groups to react together to form a polymer shell surrounding the droplets, and thereby forming capsules comprising the fluid.

9. A process according to claim 8 in which the internal phase further comprises a plurality of electrically charged particles capable of moving through the internal phase upon application of an electric field thereto.

10. A process according to claim 8 in which the dispersion medium is an aqueous medium and the internal phase is an organic medium.

11. A process according to claim 8 in which one of the first and second reactive groups comprises an acid anhydride grouping and the other comprises an amine group, whereby the first and second reactive groups react together to form amide linkages.

12. A process according to claim 8 in which one of the first and second prepolymers comprises poly(isoprene-graft-maleic anhydride) and the other comprises polyethyleneimine.

* * * * *